(12) United States Patent
Onose (10) Patent No.: US 7,839,119 B2
(45) Date of Patent: Nov. 23, 2010

(54) CHARGING DEVICE FOR PORTABLE ELECTRONIC DEVICE BATTERY AND PORTABLE PHONE BATTERY

(75) Inventor: Katsuya Onose, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 547 days.

(21) Appl. No.: 11/942,289

(22) Filed: Nov. 19, 2007

(65) Prior Publication Data

US 2008/0224661 A1 Sep. 18, 2008

(30) Foreign Application Priority Data

Nov. 20, 2006 (JP) .............................. 2006-312459

(51) Int. Cl.
*H02J 7/00* (2006.01)
(52) U.S. Cl. ...................... 320/113; 320/103; 320/107; 320/115
(58) Field of Classification Search .................. 320/113
See application file for complete search history.

(56) References Cited

U.S. PATENT DOCUMENTS 5,343,136 A * 8/1994 Yamaguchi et al. ......... 320/103
5,656,914 A * 8/1997 Nagele et al. ............... 320/110
7,535,196 B2 * 5/2009 Nagasawa ................... 320/114
2008/0106232 A1 * 5/2008 Idzik et al. ................... 320/103

FOREIGN PATENT DOCUMENTS

| JP | 2001-298862 | 10/2001 |
|----|-------------|---------|
| JP | 2004-112909 | 4/2004 |
| JP | 2006-141187 | 6/2006 |

* cited by examiner

*Primary Examiner*—Edward Tso
*Assistant Examiner*—M'Baye Diao
(74) *Attorney, Agent, or Firm*—Whitham Curtis Christofferson & Cook, PC (57) ABSTRACT

A charging device for a portable phone is provided which is capable of achieving its improved usability by making the device small-sized, improving its portability, and enabling instant telephone speech even in a state in which a battery of the portable phone has been exhausted. The charging device for a portable phone for charging a rechargeable battery housed in a portable phone includes the first charging section to charge the rechargeable battery housed in the portable phone and the second charging section to charge the lithium-ion battery built in the first charging section in which the first and second charging sections are connected so as to be freely detachable and attachable from or to each other and can be disconnected from each other.

8 Claims, 7 Drawing Sheets

CHARGING DEVICE FOR PORTABLE ELECTRONIC DEVICE BATTERY AND PORTABLE PHONE BATTERY

INCORPORATION BY REFERENCE

This application is based upon and claims the benefit of priority from Japanese Patent Application No. 2006-312459, filed on Nov. 20, 2006, the disclosure of which is incorporated herein in its entirely by reference.

BACKGROUND OF THE INVENTION

1. Field of the Invention

The present invention relates to a charging device for a portable electronic device battery and especially a portable phone battery adapted to charge a rechargeable battery housed in a portable phone.

2. Description of the Related Art

Conventionally, a charging device for portable phones to charge a rechargeable battery housed in a portable phone by using a dry battery as a power source is available. In the conventional dry battery-type charging device, a 4.5v or 6v power source made up of, for example, three or four AA batteries or three or four AAA batteries serially connected to one another is connected directly to a rechargeable battery housed in the portable phone to charge the rechargeable battery at a charging voltage of 4.5V or 6V, or a power source made up of, for example, two AA batteries or two AAA batteries serially connected to one another with its voltage boosted up to about 5V is used to charge a rechargeable battery housed in the portable phone at a charging voltage of about 5V.

A capacity of a lithium-ion battery housed in a recently-available portable phone is made larger in response to the expansion and sophistication of functions of the portable phone and, therefore, the use of a charging device made up of two or four AA or AAA batteries serially connected to one another is effective to achieve efficient charging of the lithium-ion battery.

The conventional dry battery-type charging device has a disadvantage in that, due to its large outside shape, it is of little practical use for portably carrying the charging device to achieve efficient charge of the rechargeable battery. Another disadvantage is that, when a supply voltage of the rechargeable battery in the portable phone drops to a level at which a telephone speech is disabled, the supply of currents from the dry battery having a high internal resistance to simultaneously meet the needs for both charging of the rechargeable battery in the portable phone and operations of functions of the portable phone is difficult and that the instant use of the function of a portable phone whose battery has become exhausted is impossible. Still another disadvantage is that the dry battery cannot be reused once it has been discharged, causing great loads on the environment and, therefore, new dry batteries have to be prepared to be used as a charging device for the portable phone.

A secondary battery pack system for a portable phone using a secondary battery instead of a dry battery is disclosed in Patent Reference 1 (Japanese Patent Application Laid-open No. 2004-112909). However, it is impossible for even the disclosed secondary battery pack system to be instantly used for the portable phone whose battery has been exhausted.

Also, a charging device for a portable phone using a lithium-ion battery that can instantly use a function of the portable phone whose battery has been exhausted is disclosed in Patent Reference 2 (Japanese Patent Application Laid-open No. 2006-141187). However, in the disclosed charging device, the charging mechanism of the lithium-ion battery in this charging device is included in the charging device and, as a result, the charging device is lacking in portability. Also, in the disclosed charging device, a protecting circuit to prevent the overdischarge, overcharge, and flowing of overcurrents in the lithium-ion battery is embedded, however, the protecting circuit is configured to protect the lithium-ion battery and not to prevent a failure and/or malfunction of an entire circuit and, therefore, the use of the lithium-ion battery only by the protection to be performed by the protecting circuit is also lacking in reliability. Moreover, in some cases, the protecting circuit does not operate for a time period for which the protecting circuit fails to respond thereto, however, in the above Patent Reference 2, the measure against this problem to be taken for the protecting circuit is not described.

SUMMARY OF THE INVENTION

In view of the above, it is an object of the present invention to provide a charging device for a portable electronic device battery and especially a portable phone battery which is capable of improving usability by making the charging device small-sized and increasing its portability and enabling a near-instant telephone conversation even with the battery of the portable phone having been exhausted.

According to a first aspect of the present invention, there is provided a charging device for a portable electronic device battery (hereinafter, may be also referred to as a portable phone battery) for charging a rechargeable battery housed in a portable phone including:

a first charging section to charge the rechargeable battery housed in the portable phone; and a second charging section to charge a lithium-ion battery built in the first charging section;

wherein the first charging section includes:

an input terminal connected to the second charging section;

a lithium-ion battery connected to the input terminal via a protecting circuit;

a boosting-type DC/DC (Direct Current/Direct Current) converter to boost a voltage output from the lithium-ion battery;

a current limiting circuit to control a direct current fed from the boosting-type DC/DC converter and to prevent flowing of currents exceeding currents required for the activation of a current protecting circuit in the portable phone;

an output connector connected to the current limiting circuit and to have an electrode to supply a direct current voltage and direct current fed from the boosting-type DC/DC converter to a charging circuit of the portable phone; and a control circuit to switch on-off the boosting-type DC/DC converter and the current limiting circuit;

wherein the second charging section includes an AC (Alternating Current) adaptor connector to be used for charging the portable phone battery and connected to the AC adaptor to convert an alternating current into a direct current having a predetermined voltage and current;

a charging circuit to charge the lithium-ion battery by using a direct current voltage and direct current fed from the AC adaptor as inputs at a constant current and voltage method;

a current backflow preventing circuit connected to an input side of the charging circuit;

an output terminal connected to the first charging section used to charge the lithium-ion battery by using the charging circuit; and an output connector to output a direct current voltage and direct current fed from the AC adaptor; and wherein the second charging section and the first charging section are freely detachable and attachable from or to each other and are disconnected from each other.

In the foregoing, a preferable mode is one, wherein the boosting-type DC/DC converter supplies a direct current voltage being higher than a voltage usable for charging the portable phone battery and being lower than a voltage activating a voltage protecting circuit of the portable phone and a direct current being larger than the maximum consuming current and being smaller than a current activating the current protecting circuit of the portable phone to a charging circuit of the portable phone.

Also, a preferable mode is one wherein the control circuit detects a voltage of the lithium-ion battery to switch on the boosting-type DC/DC converter and the current limiting circuit when a voltage of the lithium-ion battery is within a voltage range from a level usable for charging the portable phone battery to a level or lower activating the protecting circuit against overcharge of the lithium-ion battery and to switch off the boosting-type DC/DC converter and current limiting circuit when a voltage of the lithium-ion battery is within a voltage range from a level being higher than a level activating the protecting circuit used to prevent overdischarge and to a level being lower than a level reaching discharge terminating and starting.

With the above configuration, by using the lithium-ion battery as a power source and making the first charging section with the lithium-ion battery built therein and the second charging section to charge the lithium-ion battery be detachable and attachable from or to each other, the charging device is made small-sized, thereby improving its portability. Moreover, the lithium-ion battery can be recharged and, therefore, no other new batteries need to be prepared, which can make the charging device be economical and which imposes less loads on the environment. Also, while a portable phone battery is being charged, the first charging section is allowed to be charged at the same time which can prevent a user from forgetting about charging.

With another configuration as above, by supplying a direct current voltage being higher than a voltage usable for charging the portable phone battery and being lower than a voltage activating voltage protection of the portable phone battery and a direct current being larger than a current usable for charging the portable phone battery and being larger than a maximum consuming current enabling the use of functions of the portable phone and being lower than a current activating current protection of the portable phone, irrespective of a remaining battery level, when the charging device for the portable phone battery, both the charge of the portable phone and use of functions of the portable phone are made possible at the same time, thereby improving its usability and avoiding temporal stop of functions of the portable phone.

With still another configuration as above, even when both the portable phone battery and the charging device for the portable phone battery are being charged at the same time, a remaining battery level of the lithium-ion battery in the charging device for the portable phone battery does not exert any adverse effect on the charging state of the portable phone battery and, as in the case in which the AC adaptor is connected to the portable phone, both the charging of the portable phone battery and the using of functions of the portable phone are made possible and, in any case, no separate and individual charging of each of the portable phone battery and charging device for the portable phone battery is required, thus preventing a user from forgetting about charging of the charging device for the portable phone battery.

With still another configuration as above, by interrupting the boosting-type DC/DC converter and current limiting circuit before the protecting circuit of the lithium-ion battery is activated, double protection is realized and a failure of the lithium-ion battery caused by overdischarge, overcharge, and flowing of overcurrents can be prevented at the time of the occurrence of a trouble or malfunction of the protecting circuit, thus enabling safe charging of the portable phone battery.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Figure 1:
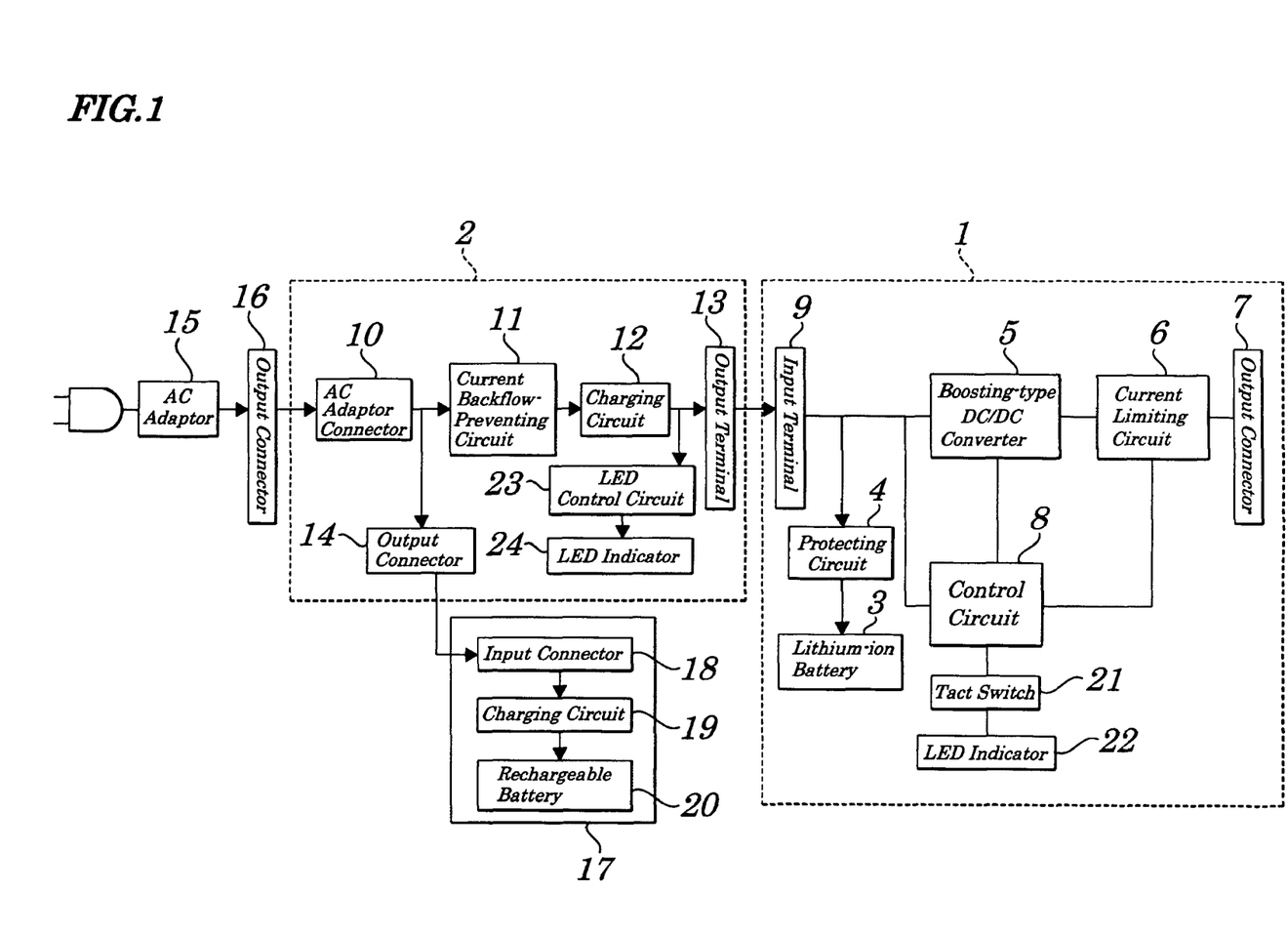
FIG. 1 is a block diagram showing operations of a charging device for a portable phone battery applied when a first charging section and the portable phone battery are charged by a second charging section according to an exemplary embodiment of the present invention.

Best modes of carrying out the present invention will be described in further detail using various embodiments with reference to the accompanying drawings. FIG. 1 is a block diagram showing configurations of a charging device for a portable phone battery (as a typical portable electronic device battery) applied when a first charging section and the portable phone are charged by a second charging section of the embodiment.

As shown in FIG. 1, the first charging section 1 includes an input terminal 9 to be connected to the second charging section, a lithium-ion battery 3 connected via the input terminal 9 and a protecting circuit 4, a boosting-type DC/DC (Direct Current/Direct Current) converter 5, a current limiting circuit 6 to control a direct current from the boosting-type DC/DC converter 5 and to prevent flowing of currents exceeding currents required for protecting a current of a portable phone, an output connector 7 connected to the current limiting circuit 6 and being equipped with an electrode to supply a direct current voltage and a direct current fed from the boosting-type DC/DC converter 5 to a charging circuit in a portable phone, a control circuit 8 to detect a voltage of the lithium-ion battery 3 and to switch on-off the boosting-type DC/DC converter 5 and the current limiting circuit 6 at a voltage at which the protecting circuit 4 operates, and an LED (Light Emitting Diode) indicator 22 connected to the control circuit 8 through a tact switch 21.

The second charging section 2 includes an AC (Alternating Current) adaptor connector 10 connected to an AC adaptor 15 to convert an alternating current used for charging a portable phone into a direct current voltage with a specified voltage, a charging circuit 12 to charge the lithium-ion battery 3 by using, as an input, a direct current voltage and a direct current output from the AC adaptor 15, a current backflow-preventing circuit 11 inserted between the adaptor connector 10 and the charging circuit 12, an output terminal 13 to connect the second charging section 2 to the first charging section 1 so that the lithium-ion battery 3 is charged by the charging circuit 12, and an output connector used for supplying a direct current voltage and direct current output from the AC adaptor 15 to the charging circuit 19 in the portable phone.

An LED indicator 24 is connected to an LED control circuit 23. The LED control circuit 23 detects a voltage of the lithium-ion battery and turns on the LED indicator at a voltage at which the lithium-ion battery is fully charged. Thus, it is made possible to know whether or not the rechargeable battery is fully charged by the LED indicator 24.

Hereinafter, operations of the first charging section 1 performed when the lithium-ion battery 3 is charged are described. At the time of the charging, the output terminal in the second charging section 2 is made to be connected to the input terminal 9 in the first charging section 1 for connection between the first charging section 1 and second charging section 2. The output connector 16 of the AC adaptor 15 is connected to the AC adaptor connector to supply the direct current voltage and direct current to the charging circuit 12. The second charging section 2 charges the lithium-ion battery 3 by constant-current and constant-voltage methods. The current backflow-preventing circuit 11 prevents a flow of currents from the second charging section 2 toward a direction of the AC adaptor 15. The protecting circuit 4 interrupts the circuit when a voltage of the lithium-ion battery 3 is boosted up to a predetermined value in order to prevent overcharging to the lithium-ion battery 3.

At the time of charging the lithium-ion battery 3, by connecting an input connector 18 of the portable phone 17 to the output connector in the second charging section 2, a direct current voltage and direct current are supplied to the charging circuit 19 in the portable phone 17 and, as a result, the portable phone 17 is charged. Since the AC adaptor 15 is connected in parallel to the portable phone 17 and the charging circuit 12, irrespective of a remaining battery level, a stable direct current voltage and direct current are applied to the portable phone 17, which enables the charge of the lithium-ion battery 3 and use of functions of the portable phone 17 at the same time.

Figure 2:
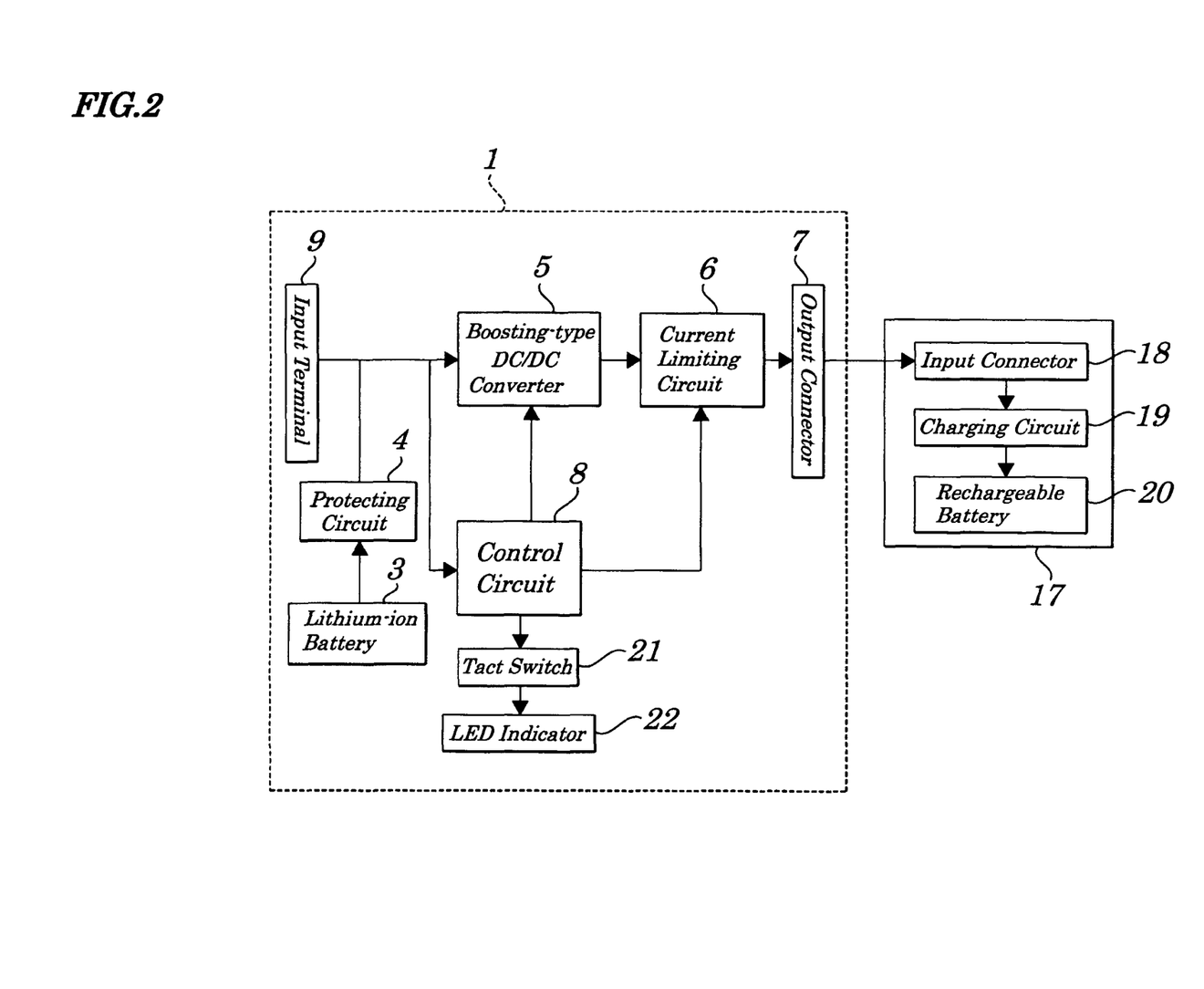
FIG. 2 is a block diagram showing operations applied when the portable phone battery is charged by the first charging section making up the charging device for the portable phone battery according to the exemplary embodiment of the present invention.

Next, operations performed when the rechargeable battery 20 in the portable phone is charged by the first charging section 1 are described. FIG. 2 is a block diagram showing configurations applied when the portable phone 17 is charged by the first charging section 1 making up the charging device for a portable phone. As shown in FIG. 2, while the portable phone 17 is being charged by the first charging section 1, only the first charging section can be used and the second charging section 2 may be disconnected. The lithium-ion battery 3 ordinarily supplies a direct current voltage of the maximum 4.2 V to the boosting-type DC/DC converter 5. At the time of charging a portable phone, the portable phone 17 is connected to an output connector 7 and a direct current voltage and direct current fed from the boosting-type DC/DC converter 5 are supplied to the charging circuit 19 in the portable phone 17 to charge the rechargeable battery 20. The boosting-type DC/DC converter 5 ordinarily sets a direct current voltage to the voltage from the range of 4V or higher, which is higher than a voltage of the lithium-ion battery 3, to 7V or lower, which is a voltage within a withstand voltage of the portable phone 17 to charge the rechargeable battery 20 in the portable phone 17 and also sets, in order to enable the use of functions of the portable phone 17, a direct current to the current from the range of 0.5 A or larger and 5 A or smaller which is a withstand current of the portable phone 17. The supply of the direct current voltage and direct current to the portable phone 17 simultaneously enables charging of the rechargeable battery 20 and use of functions of the portable phone 17.

The current limiting circuit 6 limits an output current and, even when the boosting-type DC/DC converter outputs a current causing a fear of making the current protecting function in the portable phone 17 stop the charge or a current causing a fear of the occurrence of a failure in the portable phone 17, has a function to allow a current and, therefore, a failure of the portable phone 17 can be prevented. The protecting circuit 4 has a function of interrupting the circuit, in order to prevent overdischarge and the flowing of overcurrents in the lithium-ion battery 3, when a voltage of the lithium-ion battery 3 is lowered to a predetermined value or when a current exceeding a predetermined value flows through the lithium-ion battery 3.

Generally, the protecting circuit for the lithium-ion battery sets its overdischarge detecting voltage to 2.4V or less. Therefore, the control circuit 8 detects a voltage of the lithium-ion battery 3 and switches on the boosting-type DC/DC converter 5 and current limiting circuit 6 in a voltage range from 3.5V, which is a voltage of the lithium-ion battery 3 allowing the charging of the portable phone 17, to 4.3V, which is a voltage of the lithium-ion battery 3 activating the protecting circuit 4 to prevent overcharge and/or overcharge of the lithium-ion battery and switches off the boosting-type DC/DC converter in a voltage range from 2.4V or higher, which is a voltage activating the protecting circuit 4 to prevent the overdischarge of the lithium-ion battery 3, to 3V or lower, which is a voltage of the lithium-ion battery 3 reaching a discharge terminating voltage. Thus, the protecting circuit 4 and control circuit 8 are so configured to protect doubly the lithium-ion battery 3 and, therefore, even if the protecting circuit 4 is in a trouble or in malfunction, the control circuit 8 can prevent the lithium-ion battery 3 from its failure caused by overdischarging.

The LED indicator 22 is connected to the control circuit 8 via the tact switch 21. When a remaining battery voltage of the lithium-ion battery 3 is a voltage or higher within a sufficient range, the control circuit 8 turns on the LED indicator 22 using the tact switch 21. Thus, by pressing the tact switch 21, the LED indicator is made to be turned on and, as a result, it is made possible to know a remaining battery level of the lithium-ion battery at any given time.

EXAMPLE

Figure 3:
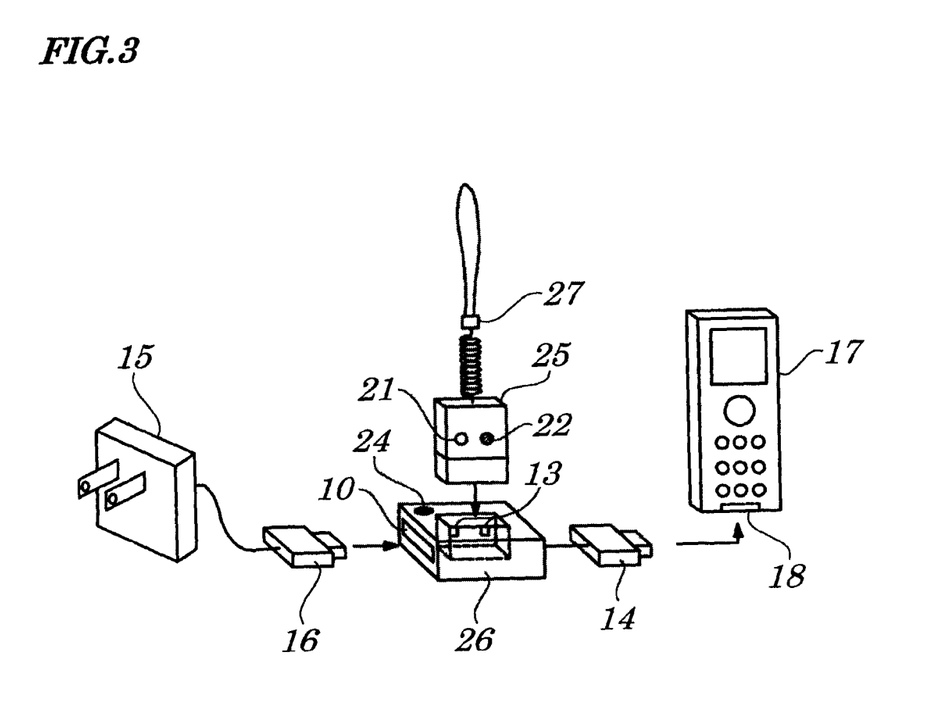
FIG. 3 is a diagram showing configurations of a charging device for the portable phone battery according to the embodiment of the present invention.

Hereinafter, the embodiment (example) of the present invention is described by referring to drawings. FIG. 3 is a diagram showing configurations of a charging device for a portable phone of the embodiment of the present invention.

The charging device for portable phones is made up of the first charging unit 25 having the first charging section to charge a rechargeable battery of a portable phone by using a lithium-ion battery in the first charging unit 25 and the second charging unit 26 having the second charging section to charge the lithium-ion battery in the first charging unit 25 and being capable of directly supplying an output from an AC adaptor to the portable phone. The AC adaptor 15 being used for the portable phone can be connected to the second charging unit 26 via the output connector 16 and, at the same time, the second charging unit 26 can be connected to the portable telephone 17. Power is supplied by a commercially available AC adaptor for the portable phone.

Figure 4A:
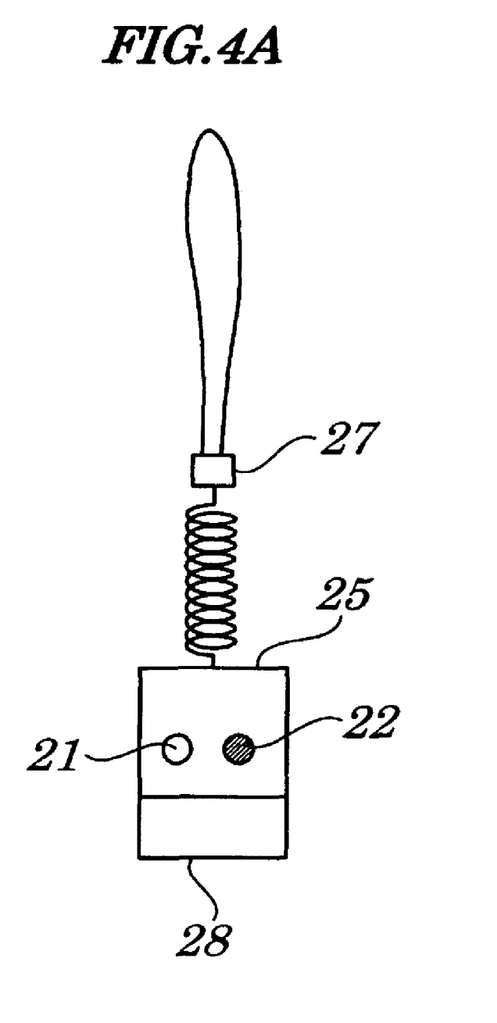
FIG. 4A is a front view of the first charging unit of the charging device for the portable phone battery and FIG. 4B is a back view of the first charging unit of the charging device for the portable phone battery according to the embodiment of the present invention.
Figure 4B:
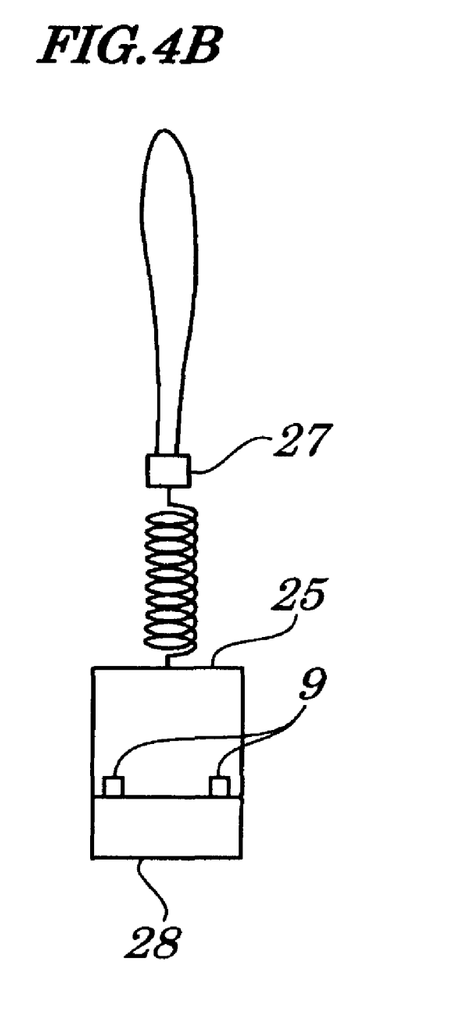
Figure 5:
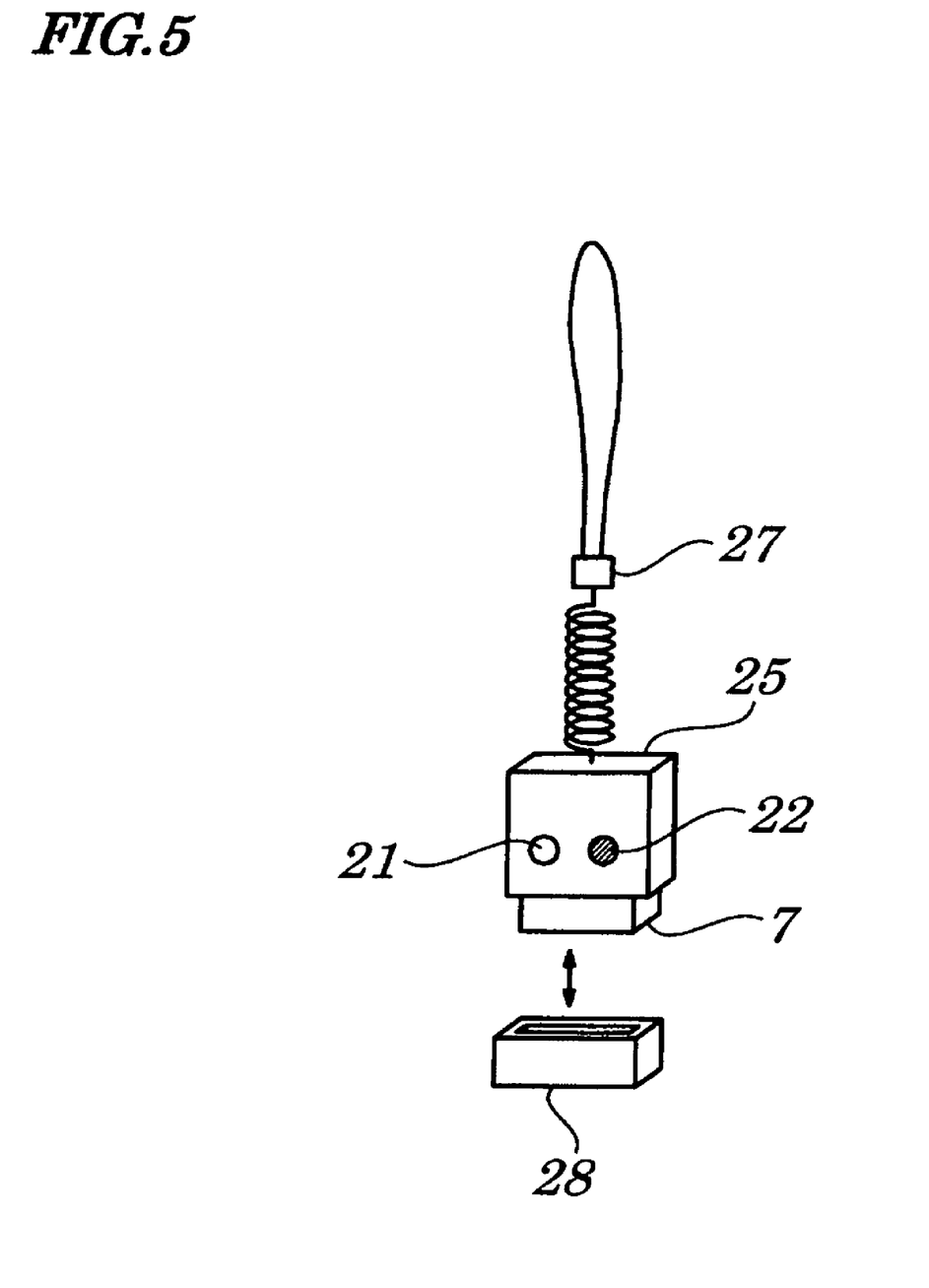
FIG. 5 is a perspective diagram showing the first charging unit of the charging device for the portable phone battery according to the embodiment of the present invention.
Figure 6:
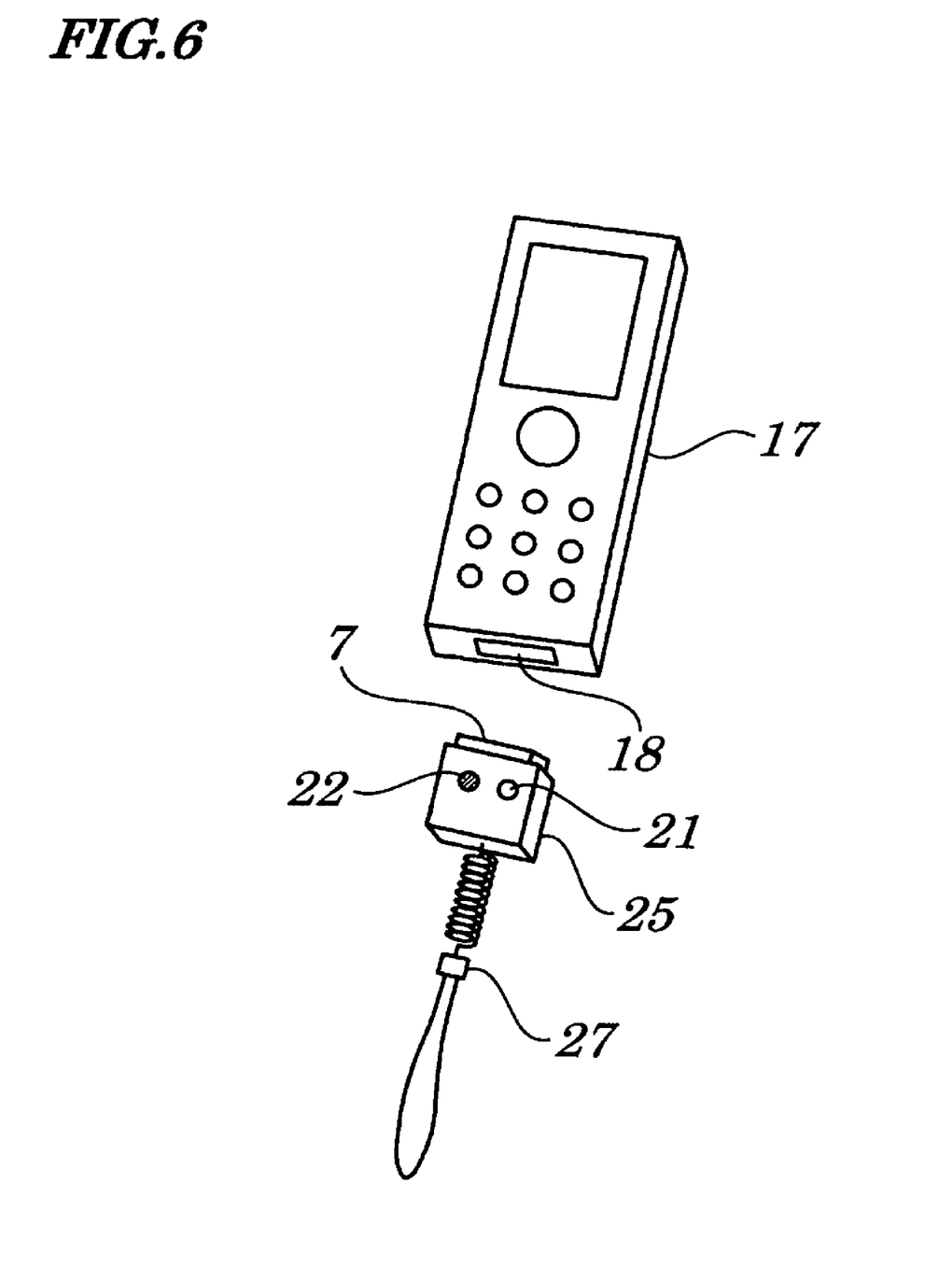
FIG. 6 is a perspective view showing the connection between the first charging unit of the charging device for the portable phone battery and the portable phone.

FIG. 4A is a front view of the first charging unit of the charging device for a portable phone and FIG. 4B is a back view of the first charging unit of the charging device for the portable phone according to the embodiment of the present invention. FIG. 5 is a perspective view showing the first charging unit of the charging device for the portable phone of the embodiment of the present invention. FIG. 6 is a perspective view showing connection between the first charging unit of the charging device for the portable phone and the portable phone.

As shown in FIGS. 4A and 4B and 5, the output connector 7 in the first charging unit 25 is mounted under a cabinet and is configured to protect the cap 28 while being not used. The first charging unit 25 is provided with the input terminal 9 and the second charging unit 26 (see FIG. 3) is provided with the output terminal 13 and, as shown in FIG. 3, by placing the first charging unit 25 on the second charging unit 26 and by making the input terminal 9 be in contact with the output terminal 13, the second charging section is made to be in contact with the first charging section, thus enabling the lithium-ion battery of the first charging section to be charged. The output connector 14 being connectable to the portable phone 17 is mounted in the second charging unit 26 and, therefore, both the first charging unit 25 and the portable phone 17 can be simultaneously charged. Moreover, when the portable phone 17 is to be charged by the first charging unit 25, as shown in FIG. 6, the portable phone 17 is charged only by the first charging unit 25 with the second charging unit 26 being disconnected. As a result, the small-sized charging device can be carried portably.

Figure 7:
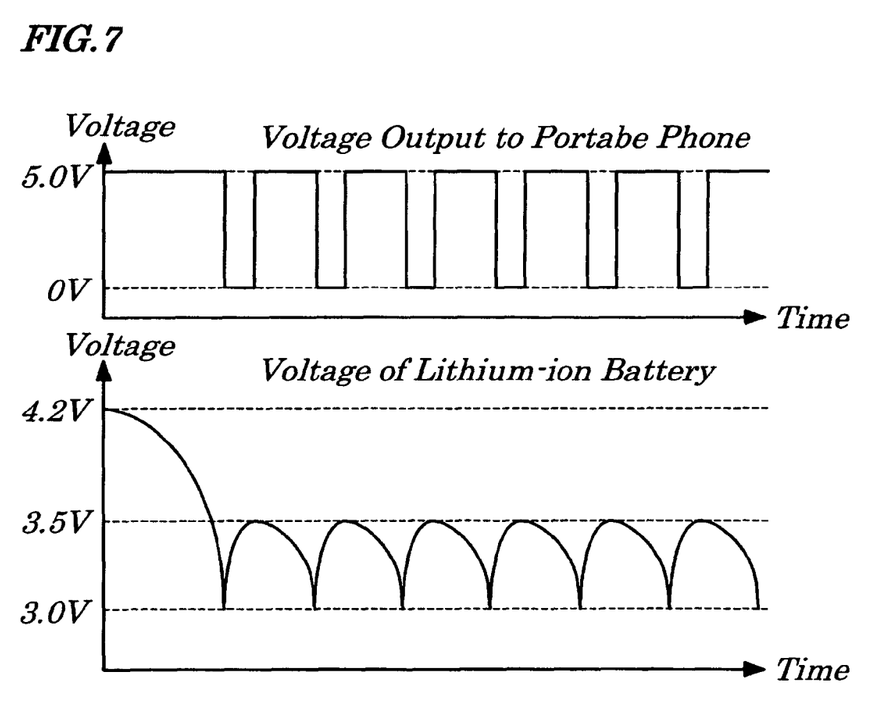
FIG. 7 is a voltage transition diagram showing a relation between a voltage of the lithium-ion battery in the charging unit of the charging device for the portable phone battery and a voltage applied to the portable phone according to the embodiment of the present invention.

Next, operations of the charging device for the portable phone battery are described by referring to FIG. 7. FIG. 7 is a voltage transition diagram showing a relation between a voltage of the lithium-ion battery in the charging unit of the charging device for the portable phone of the embodiment of the present invention and a voltage applied to the portable phone. When the portable phone 17 is charged by the first charging section 1 in the first charging unit 25, the boosting-type DC/DC converter 5 supplies a direct current voltage of 5.0V and a direct current of 1 A to the portable phone 17. A control circuit 8, when detecting a voltage of 3.5V to 4.2V of the lithium-ion battery 3, switches on the boosting-type DC/DC converter 5 and current limiting circuit 6 and switches off, when detecting a voltage of 3.0V or less of the lithium-ion battery 3, the boosting-type DC/DC converter 5 and the current limiting circuit 6. By the above control, the control circuit 8 switches off the boosting-type DC/DC converter 5 and current limiting circuit 6 before the protecting circuit 4 detects overcharge and overdischarge and stops power from the lithium-ion battery, which achieves double protection of the first charging section. Moreover, by the stop of the supply of power from the lithium-ion battery 3, the voltage of the charging device is again boosted. At this time, according to the embodiment, intermittent discharge is performed as shown in FIG. 7, thereby drawing the best out of capacity of the lithium-ion battery 3.

An LED control circuit 23 in the second charging section 2 shown in FIG. 1 turns on an LED indicator 24 when a voltage of the lithium-ion battery 3 is 4.2V or lower. When the first charging unit 25 is charged by the second charging unit 26 in FIG. 3, the LED indicator 24 is turned off when the voltage of the lithium-ion battery 3 exceeds 4.2V, thereby informing that the charge is completed.

The control circuit 8 in the first charging section 1 shown in FIG. 2 turns on an LED indicator 22 through a tact switch 21 when the voltage of the lithium-ion battery 3 is 3.5V or higher. Moreover, as shown in FIG. 4, the tact switch 21 is exposed to the outside, which enables a remaining battery level to be informed manually. Additionally, as shown in FIGS. 3 to 5, a strap 27 is attached to the case of the first charging unit 25 of the embodiment. By connecting the first charging unit to the portable phone using the strap, forgetting about charging, and leaving or losing of the first charging unit can be prevented, thus improving convenience.

It is apparent that the present invention is not limited to the above embodiments but may be changed and modified without departing from the scope and spirit of the invention.

What is claimed is:

1. A charging device for a portable phone battery for charging a rechargeable battery housed in a portable phone comprising:
   a first charging section to charge said rechargeable battery housed in the portable phone; and
   a second charging section to charge a lithium-ion battery built in said first charging section;
   wherein said first charging section comprises:
   an input terminal connected to said second charging section;
   said lithium-ion battery connected to said input terminal via a protecting circuit;
   a boosting-type DC/DC (Direct Current/Direct Current) converter to boost a voltage output from said lithium-ion battery;
   a current limiting circuit to control a direct current fed from said boosting-type DC/DC converter and to prevent flowing of currents exceeding currents required for an activation of a current protecting circuit in the portable phone;
   an output connector connected to said current limiting circuit and to have an electrode to supply a direct current voltage and direct current fed from said boosting-type DC/DC converter to a charging circuit of the portable phone; and
   a control circuit to switch on-off said boosting-type DC/DC converter and said current limiting circuit;
   wherein said second charging section comprises an AC (Alternating Current) adaptor connector to be used for charging said portable phone and connected to an AC adaptor to convert an alternating current into a direct current having a predetermined voltage and current;
   a charging circuit to charge said lithium-ion battery by using a direct current voltage and direct current fed from said AC adaptor as inputs at constant current and voltage methods;
   a current backflow preventing circuit connected to an input side of said charging circuit;
   an output terminal connected to said first charging section used to charge said lithium-ion battery by using said charging circuit; and
   an output connector to output a direct current voltage and direct current fed from said AC adaptor; and wherein said second charging section and said first charging section are freely detachable and attachable from or to each other and are disconnected from each other.

2. The charging device for the portable phone battery according to claim 1, wherein said boosting-type DC/DC converter supplies a direct current voltage being higher than a voltage usable for charging a portable phone and being lower than a voltage activating a voltage protecting circuit of a portable phone and a direct current being larger than a maximum consuming current and being smaller than a current activating said current protecting circuit of a portable phone to a charging circuit of a portable phone.

3. The charging device for the portable phone battery according to claim 1, wherein said control circuit detects a voltage of said lithium-ion battery to switch on said boosting-type DC/DC converter and said current limiting circuit when a voltage of said lithium-ion battery is within a voltage range from a level usable for charging the portable phone to a level or lower activating said protecting circuit against overcharge of said lithium-ion battery and to switch off said boosting-type DC/DC converter and said current limiting circuit when a voltage of said lithium-ion battery is within a voltage range from a level being higher than a level activating said protecting circuit used to prevent overdischarge and to a level being lower than a level reaching discharge terminating and starting.

4. The charging device for the portable phone battery according to claim 2, wherein said control circuit detects a voltage of said lithium-ion battery to switch on said boosting-type DC/DC converter and said current limiting circuit when a voltage of said lithium-ion battery is within a voltage range from a level usable for charging the portable phone to a level or lower activating said protecting circuit against overcharge of said lithium-ion battery and to switch off said boosting-type DC/DC converter and current limiting circuit when a voltage of said lithium-ion battery is within a voltage range from a level being higher than a level activating said protecting circuit used to prevent overdischarge and to a level being lower than a level reaching discharge terminating and starting.

5. A charging device for a portable electronic device battery for charging a rechargeable battery housed in a portable electronic device comprising:

a first charging section to charge said rechargeable battery housed in the portable electronic device; and a second charging section to charge a lithium-ion battery built in said first charging section;

wherein said first charging section comprises:

an input terminal connected to said second charging section;

said lithium-ion battery connected to said input terminal via a protecting circuit;

a boosting-type DC/DC (Direct Current/Direct Current) converter to boost a voltage output from said lithium-ion battery;

a current limiting circuit to control a direct current fed from said boosting-type DC/DC converter and to prevent flowing of currents exceeding currents required for an activation of a current protecting circuit in the portable electronic device;

an output connector connected to said current limiting circuit and to have an electrode to supply a direct current voltage and direct current fed from said boosting-type DC/DC converter to a charging circuit of the portable electronic device; and a control circuit to switch on-off said boosting-type DC/DC converter and said current limiting circuit;

wherein said second charging section comprises an AC (Alternating Current) adaptor connector to be used for charging said portable electronic device and connected to an AC adaptor to convert an alternating current into a direct current having a predetermined voltage and current;

a charging circuit to charge said lithium-ion battery by using a direct current voltage and direct current fed from said AC adaptor as inputs at constant current and voltage methods;

a current backflow preventing circuit connected to an input side of said charging circuit;

an output terminal connected to said first charging section used to charge said lithium-ion battery by using said charging circuit; and an output connector to output a direct current voltage and direct current fed from said AC adaptor; and wherein said second charging section and said first charging section are freely detachable and attachable from or to each other and are disconnected from each other.

6. The charging device for the portable electronic device battery according to claim 5, wherein said boosting-type DC/DC converter supplies a direct current voltage being higher than a voltage usable for charging a portable electronic device and being lower than a voltage activating a voltage protecting circuit of a portable electronic device and a direct current being larger than a maximum consuming current and being smaller than a current activating said current protecting circuit of a portable electronic device to a charging circuit of a portable electronic device.

7. The charging device for the portable electronic device battery according to claim 5, wherein said control circuit detects a voltage of said lithium-ion battery to switch on said boosting-type DC/DC converter and said current limiting circuit when a voltage of said lithium-ion battery is within a voltage range from a level usable for charging the portable electronic device to a level or lower activating said protecting circuit against overcharge of said lithium-ion battery and to switch off said boosting-type DC/DC converter and said current limiting circuit when a voltage of said lithium-ion battery is within a voltage range from a level being higher than a level activating said protecting circuit used to prevent overdischarge and to a level being lower than a level reaching discharge terminating and starting.

8. The charging device for the portable electronic device battery according to claim 6, wherein said control circuit detects a voltage of said lithium-ion battery to switch on said boosting-type DC/DC converter and said current limiting circuit when a voltage of said lithium-ion battery is within a voltage range from a level usable for charging the portable electronic device to a level or lower activating said protecting circuit against overcharge of said lithium-ion battery and to switch off said boosting-type DC/DC converter and current limiting circuit when a voltage of said lithium-ion battery is within a voltage range from a level being higher than a level activating said protecting circuit used to prevent overdischarge and to a level being lower than a level reaching discharge terminating and starting.

* * * * *